Jan. 28, 1964     L. C. GOURLIE     3,119,165
AUTOMATIC CONCRETE PIPE MOLDING MACHINE FOR BELLED PIPE
Filed March 20, 1961     11 Sheets-Sheet 1

LARRY C. GOURLIE
*INVENTOR.*

BY Clarence M. Tuck

Jan. 28, 1964  L. C. GOURLIE  3,119,165
AUTOMATIC CONCRETE PIPE MOLDING MACHINE FOR BELLED PIPE
Filed March 20, 1961  11 Sheets-Sheet 2

LARRY C. GOURLIE
INVENTOR.

BY *Clarence M. Tuck*

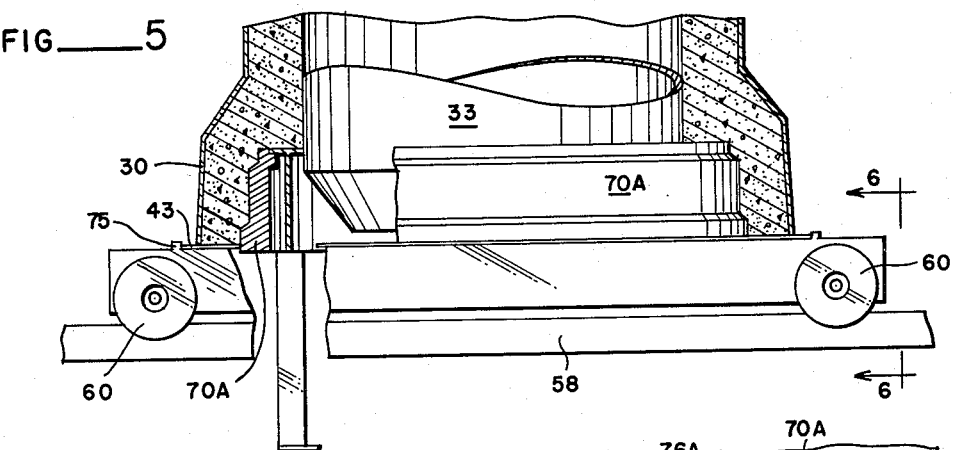
FIG. 5
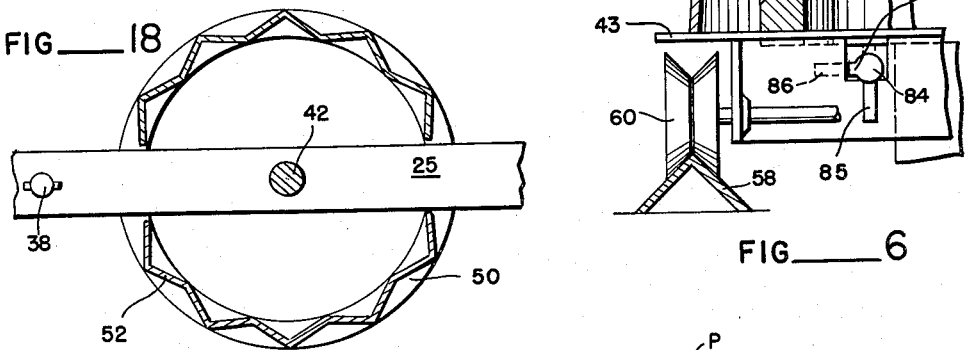
FIG. 18
FIG. 6
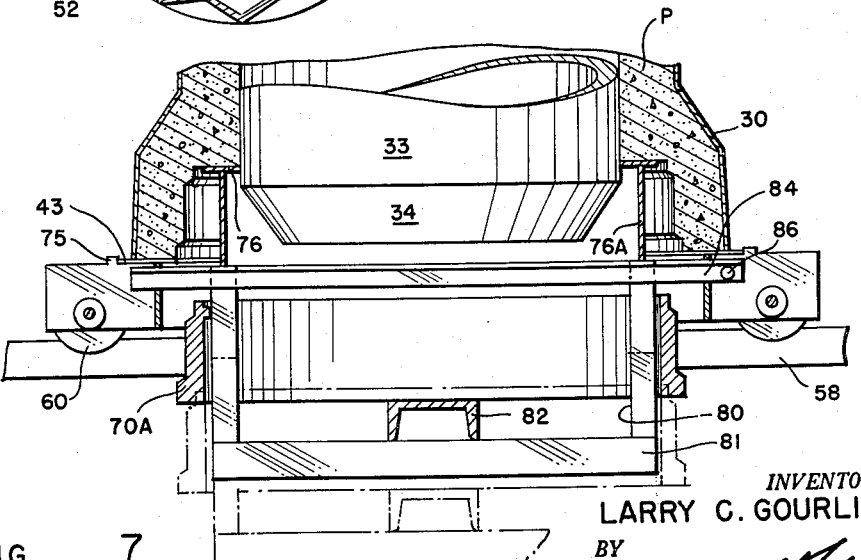
FIG. 7
INVENTOR.
LARRY C. GOURLIE
BY
Clarence M. Tuck Jan. 28, 1964  L. C. GOURLIE  3,119,165
AUTOMATIC CONCRETE PIPE MOLDING MACHINE FOR BELLED PIPE
Filed March 20, 1961  11 Sheets-Sheet 4
FIG. 8
FIG. 9
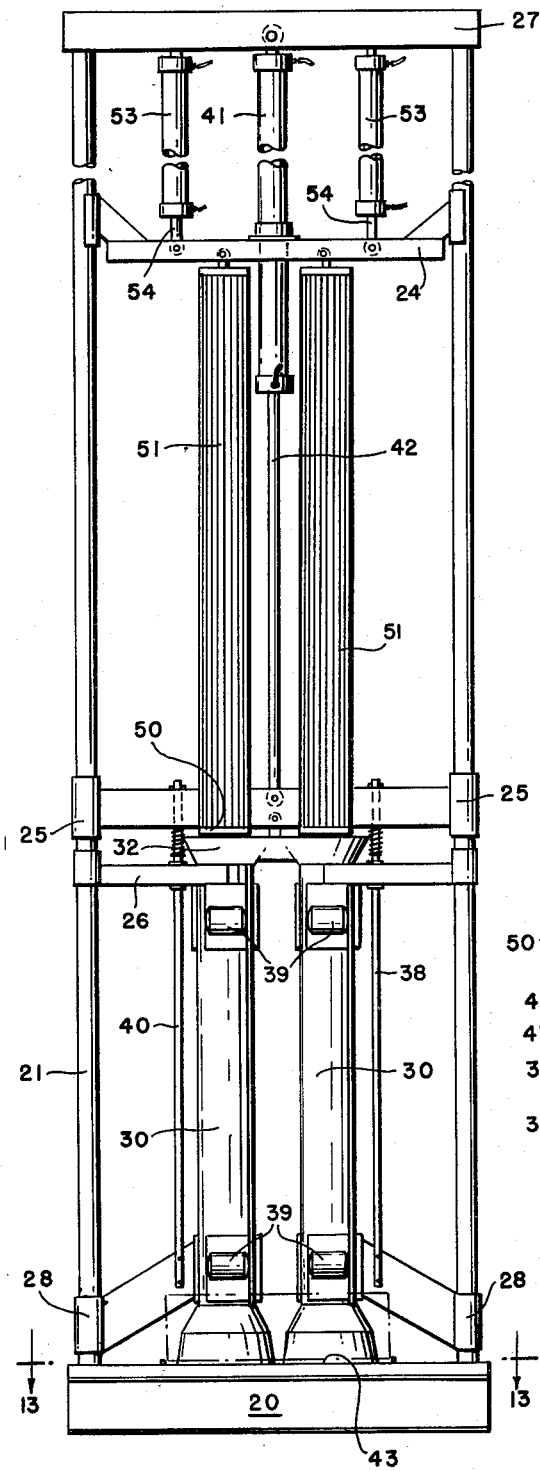
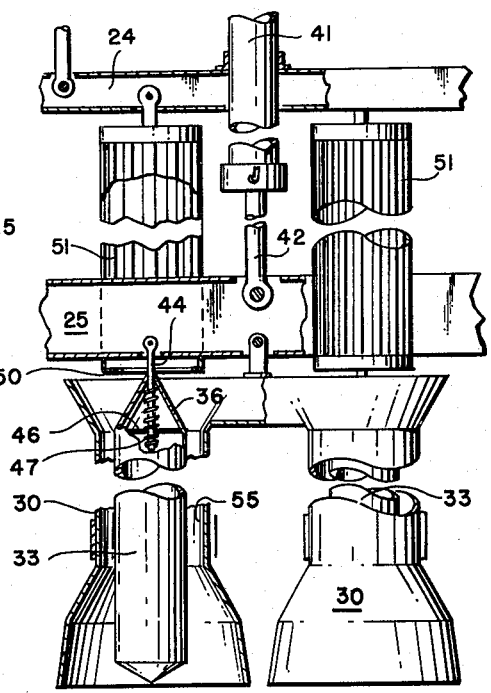
INVENTOR
LARRY C. GOURLIE
BY Clarence M. Tuck
ATTORNEY Jan. 28, 1964      L. C. GOURLIE      3,119,165
AUTOMATIC CONCRETE PIPE MOLDING MACHINE FOR BELLED PIPE
Filed March 20, 1961      11 Sheets-Sheet 5
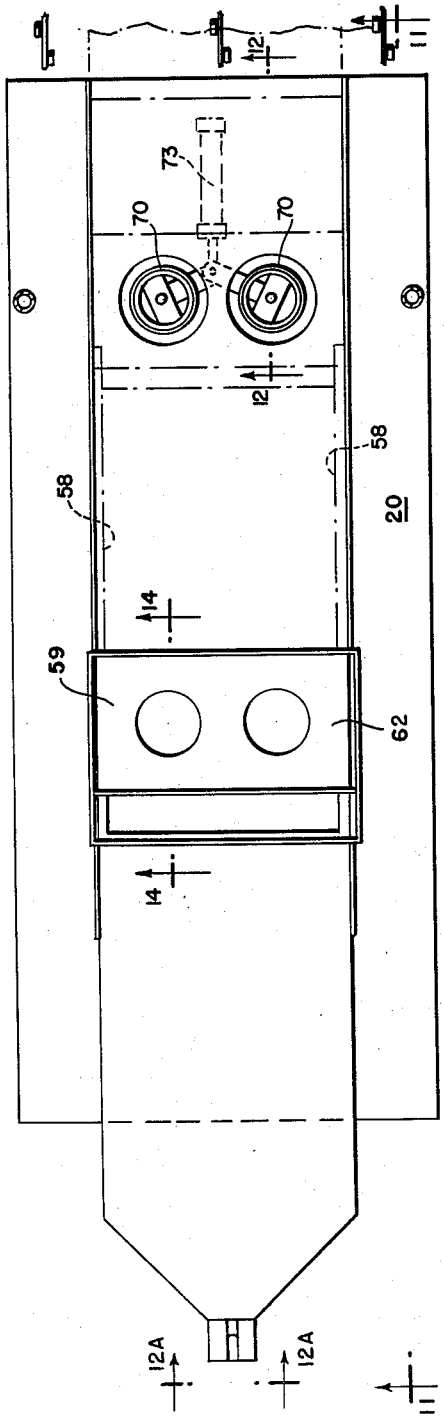
FIG___10
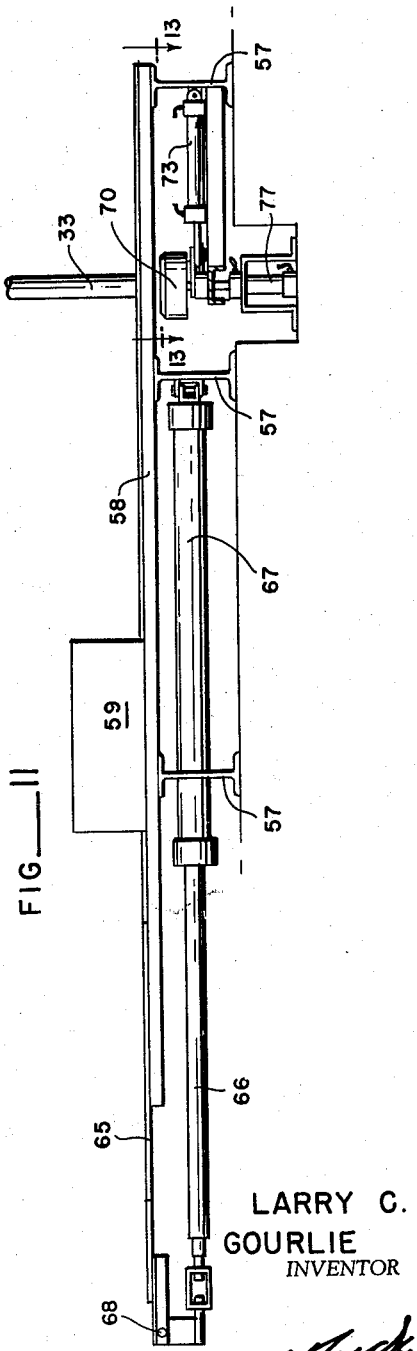
FIG___11
LARRY C. GOURLIE
INVENTOR
BY *Clarence M. Fisk*
ATTORNEY Jan. 28, 1964     L. C. GOURLIE     3,119,165
AUTOMATIC CONCRETE PIPE MOLDING MACHINE FOR BELLED PIPE
Filed March 20, 1961     11 Sheets-Sheet 6
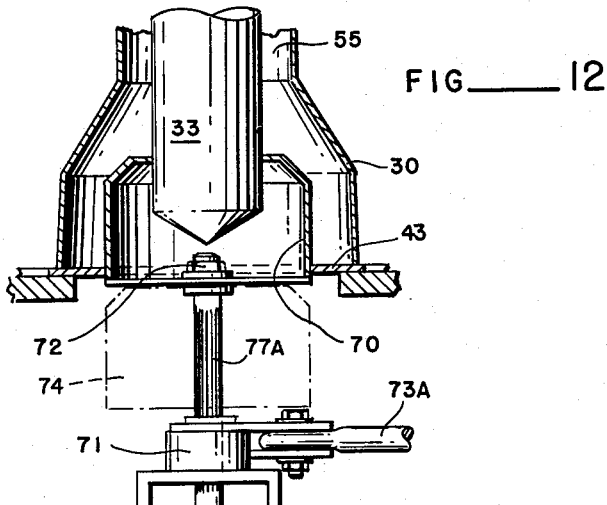
FIG___12
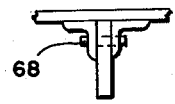
FIG___12A
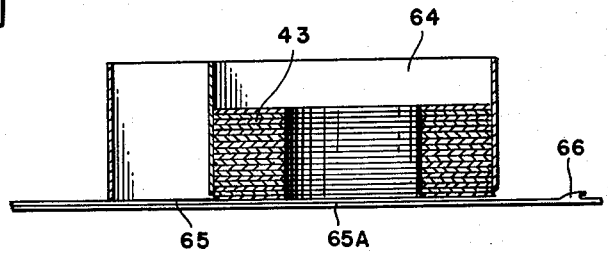
FIG___14
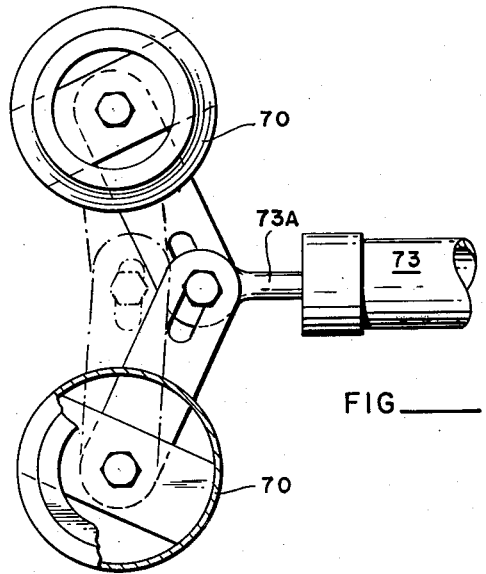
FIG___13
INVENTOR
LARRY C. GOURLIE
BY *Clarence M. Tuck*
ATTORNEY

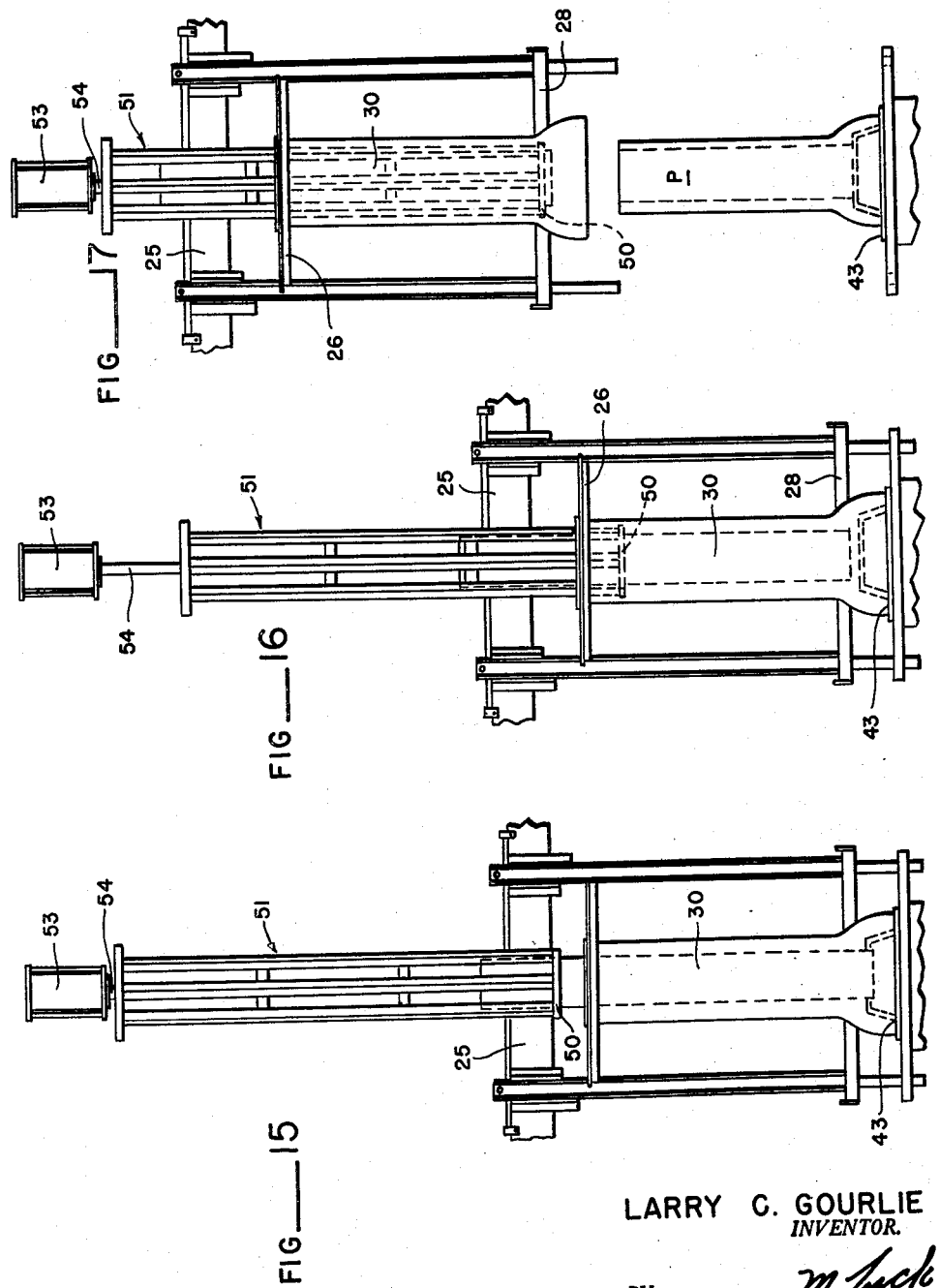

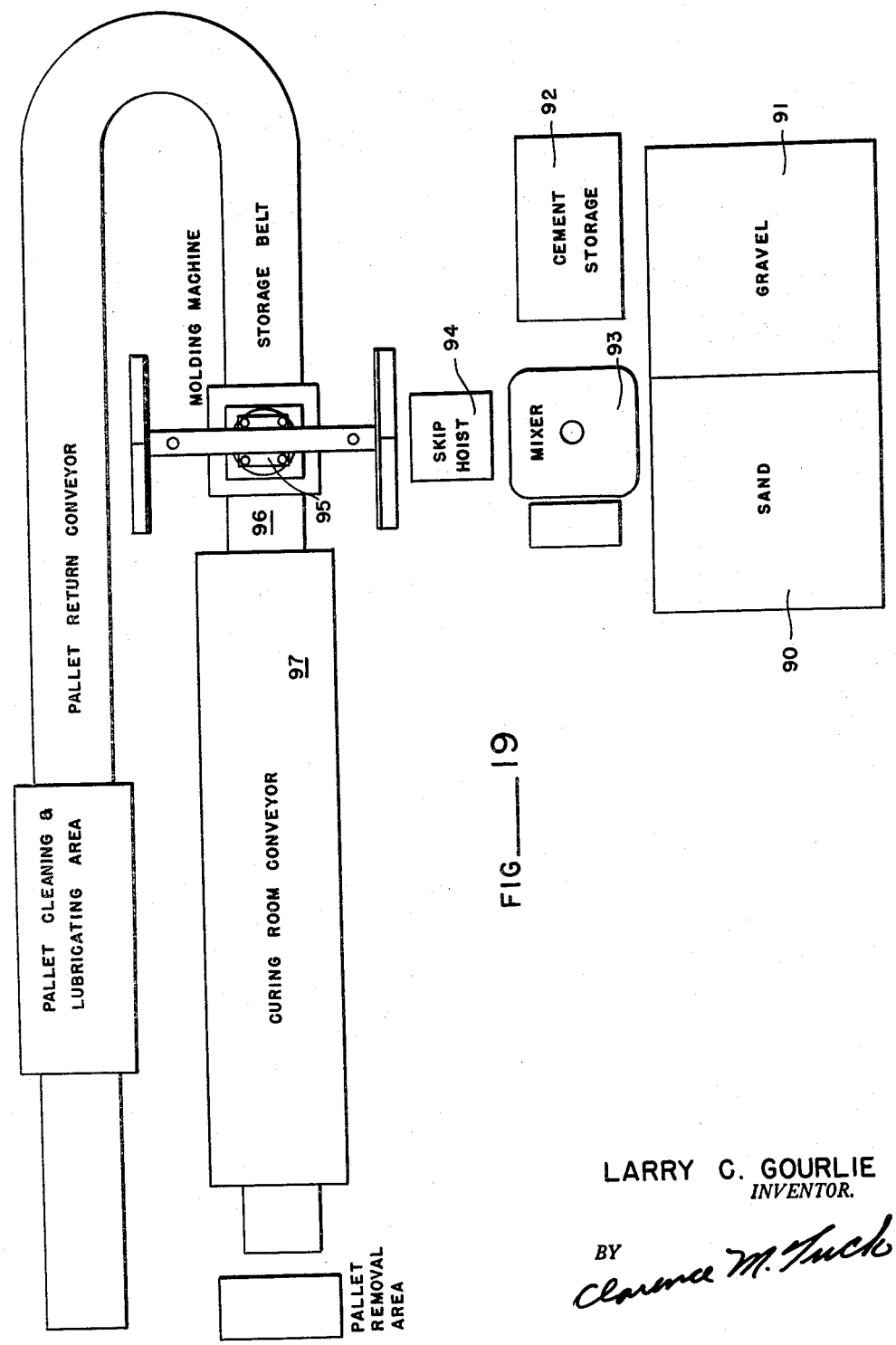

Jan. 28, 1964     L. C. GOURLIE     3,119,165
AUTOMATIC CONCRETE PIPE MOLDING MACHINE FOR BELLED PIPE
Filed March 20, 1961     11 Sheets-Sheet 9

FIG—20

LARRY C. GOURLIE
*INVENTOR.*

BY

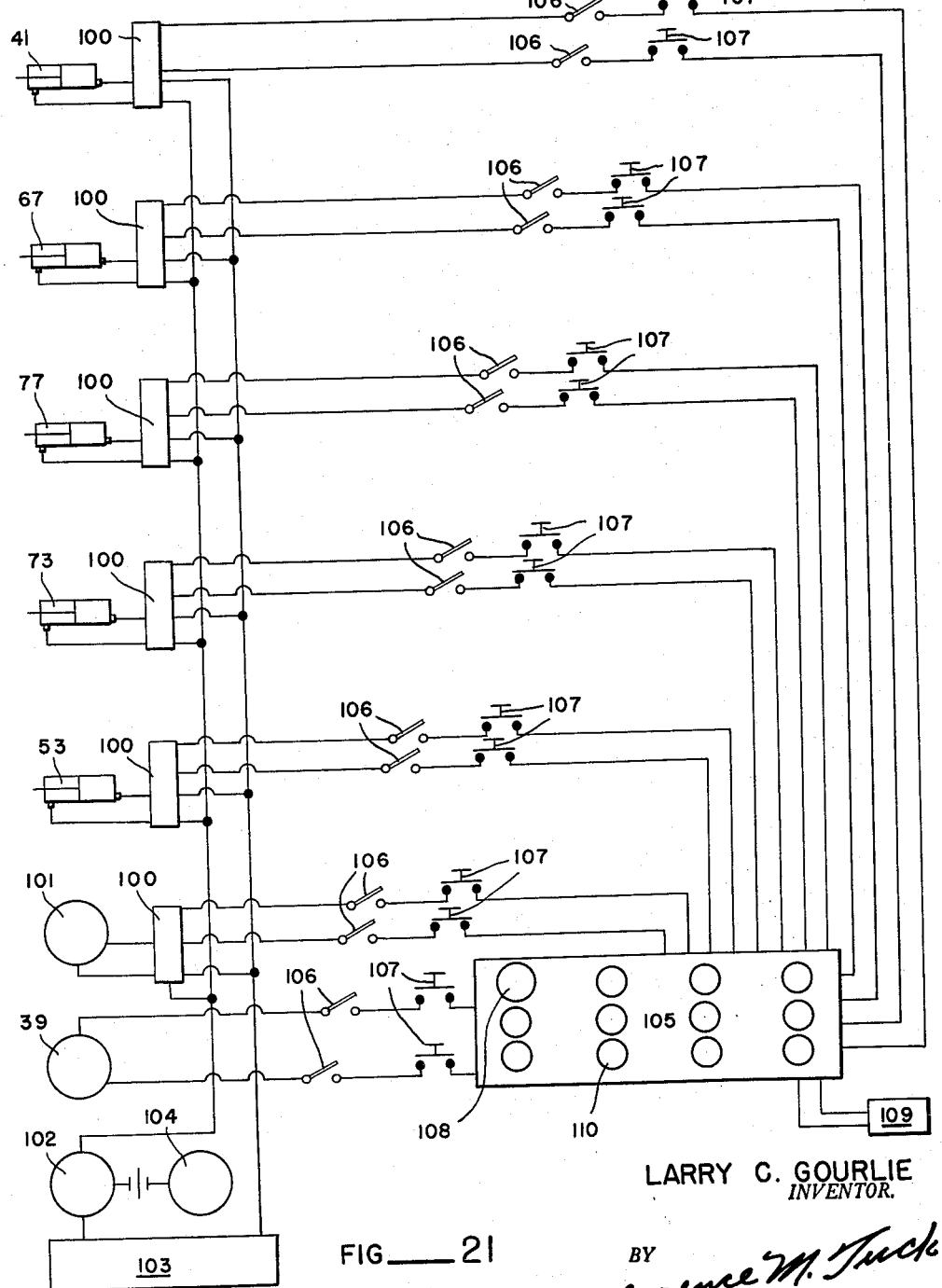

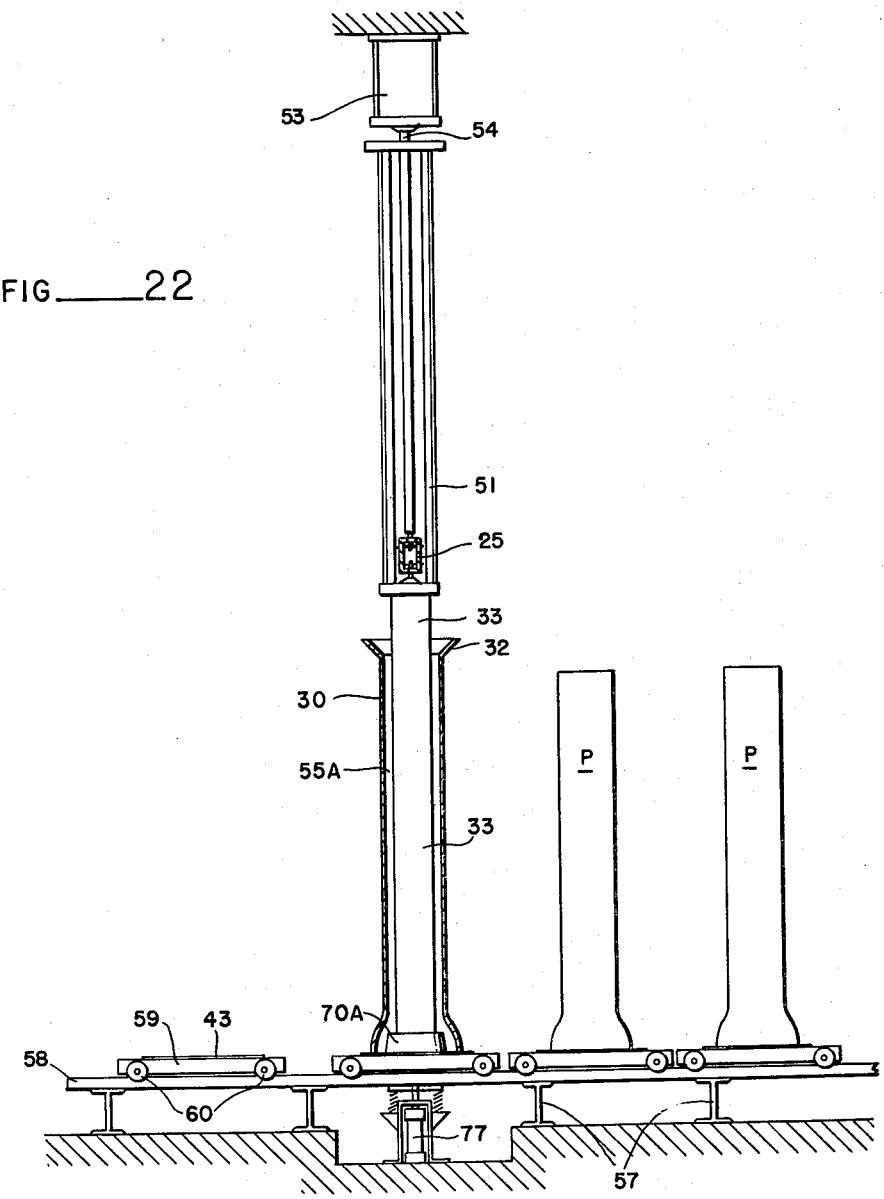

United States Patent Office 3,119,165
Patented Jan. 28, 1964

3,119,165
AUTOMATIC CONCRETE PIPE MOLDING
MACHINE FOR BELLED PIPE
Larry C. Gourlie, Everett, Wash., assignor, by mesne assignments, to Boise-Cascade Corporation, Boise, Idaho, a corporation of Delaware
Filed Mar. 20, 1961, Ser. No. 96,999
4 Claims. (Cl. 25—30)

This present invention relates to the general art of machines for molding belled pipe, especially in the longer lengths. Means are provided for the tamping of the concrete aggregates in the molds and means are provided for mechanically stripping both the inner or core mold and the outer mold off of the green concrete pipe. This present application is a continuation-in-part of my co-pending United States patent application, Serial No. 676,306, entitled Automatic Concrete Pipe Molding Machine, now abandoned.

Concrete pipe has long been used because of its durability and the basic low cost of the aggregates used to make up the pipe. Concrete pipe was able to competitively meet pipe made of other materials and this is still true in the larger sizes such as are used for sewers, drainage, and the like. In the field of smaller pipe, in the range of four to twenty-four inches inside diameter concrete pipes are meeting with severe competition from clay products, wood products, metal products, and more recently plastic products. One of the great difficulties experienced in the making of concrete pipe at this time is the relatively high percentage of labor that has been employed, of necessity, in making the concrete pipe, first by hand which method is now beyond the realm of being competitive and secondly the use of machines that are semi-automatic in operation. In this present application it is believed I have disclosed a method of making competitively priced belled concrete pipe and have created a machine for this use that can be easily controlled by the newer electronic control means so that sequential operation can be obtained with the dead time between operations substantially reduced to zero. It is therefore believed that I have produced in effect a new machine and a new method for making belled concrete pipe in which all the sequential operations can be largely automatically controlled. A very minimum of supervisory personnel are needed in the production of pipe under this method in which mechanical and electronic means control high speed operation with very little time lost between successive steps.

The principal object of this present invention is therefore to provide a pipe making machine wherein the various operations can be machine accomplished and the sequential steps necessary to produce the steps can be electronically controlled so that the machine itself becomes substantially automatic in its operations.

A further object of this present invention is to provide for making concrete pipe in a vertical position and with the bell end of the pipe down in order that automation can be fully employed in the handling of the molded pipe after the molding equipment has been removed from the same.

A further object of this present invention is to provide convenient automatic means for settling or tamping the concrete aggregates in place by vibration and to then apply compression pressure of considerable magnitude during the final forming of the pipe during which period, vibration is provided, and to thus insure a very dense body for the finished pipe.

A further object of this invention is to provide mold filling means of a type that in effect causes the aggregates, in granular form, to flow into the mold and which being under vibration tends to settle the aggregate into a very dense body.

A further object of this present invention is to provide machine equipment in which each machine will handle a wide range of diameters and lengths of pipe so that market requirements can be entirely satisfied and this all with an automatic operation which reduces operational personnel to a minimum.

A further object of this invention is to provide a sequential method of making belled concrete pipe so that it will be uniform in density throughout its length and to further provide that the inner surface of the belled portion of the pipe will be smooth in a final operation and the pipe in the larger sizes is molded on a temporary wheeled platen on which it will be transported and stored during its curing stage.

Further objects, advantages and capabilities will be apparent from the description and disclosure in the drawings, or may be comprehended or are inherent in the device.

In the drawings:

FIGURE 5 is a view similar in part to FIGURE 4 but on a still larger scale to more clearly illustrate the combined use of the troweling bell mold contour former member and also the simplified mold member that will be left in the pipe during its transportation from the machine and passing through the curing stage.

FIGURE 6 is a fragmentary sectional view on an enlarged scale taken along the line 6—6 of FIGURE 5.

FIGURE 7 is a view similar to FIGURE 5 but illustrates the equipment and means for removing the troweling member which is expensive and is part of the molding machine. The pipe in fragmentary form with the core and outer mold casing still in place and with a temporary platen carrying the weight of the pipe so that the weight of the pipe will not tend to crush the green concrete bell.

FIGURE 8 is a transverse elevation of my pipe making machine and shows it rearranged through the use of alternate parts for the manufacture of two small diameter and long lengths of belled pipe.

FIGURE 9 is a view taken in the same sense as FIGURE 8 but showing many of the parts broken and moved together so as to have the scale of certain of the parts large enough to be clearly understood.

FIGURE 10 is a top plan view of the platform on which the concrete pipe is actually molded and shows a top plan view of certain of the parts shown in FIGURE 3.

FIGURE 11 is a side elevation with certain parts shown in section to more fully illustrate the operating means for moving the transfer carriage and for energizing the mold member which does the troweling of the inner surface of the bell.

FIGURE 12 is a vertical sectional view showing the lower portion of the mold members in section and taken along the line 12—12 of FIGURE 10.

FIGURE 12a is an end view of a shear pin safety means, taken along the line 12a—12a of FIGURE 10.

FIGURE 13 shows a typical means for turning the interior troweling and bell mold member throughout a limited swing in order to achieve the troweling action. This figure shows two mold units being serviced by the same actuating and might be considered a sectional view of FIGURE 8 and along the line 13—13 thereof.

FIGURE 14 illustrates a hopper means which is used in storing and feeding annular plates used to make the lower or bottom plate portion of the mold. These members go with the pipe through the curing stage and are automatically fed to the molding position in the machine.

FIGURE 15 is a diagrammatic view illustrating the use of the hold-down ring that is employed to compress the aggregate of the extreme upper end of the pipe during molding and to hold the pipe against upward movement when the core and outer shell portions of the mold are stripped from the green pipe. This figure shows the hold-down ring before it is lowered into position.

FIGURE 16 is a view similar to that of FIGURE 15 showing the hold-down ring in contact with the upper end of the green concrete pipe.

FIGURE 17 illustrates the final withdrawal of the outer mold, the core mold members and the lifting of the hold-down ring so that the finished pipe may be moved from its place of forming.

FIGURE 18 is a horizontal sectional view through a variant form of column used to apply pressure to and to maneuver the holddown ring.

FIGURE 19 illustrates a preferred arrangement of a pipe making plant utilizing this equipment and method. This figure and FIGURES 15, 16 and 17 are identical with figures from my co-pending application Serial No. 676,306.

FIGURE 20 is a diagram illustrating the various sequential functions of the various control and operational means showing the times in seconds required for each operation.

FIGURE 21 is a diagram showing the various fluid piston and coacting cylinder pairs, the hydraulic valve means and the electrical switching means to actuate the same in conformity to the intelligence provided by the limit switches.

FIGURE 22 is an elevation illustrating, in diagrammatic form, the means for handling certain types of concrete pipe.

In this invention every consideration has been given to providing a basic machine which can be employed to make one of the larger sizes of pipes of 18 or 24 inch inside diameter or to make two or four of the smaller diameter pipes which will use substantially the same amount of aggregates. This overcomes one of the undesirable characteristics encountered in automatic pipe machinery in the past which might work economically and efficiently on 18 inch pipe but when used to make 4 or 6 inch pipe the machine time was substantially constant although only one pipe resulted which probably would have less than one quarter of the market value of the larger pipe.

Every effort has further been made to take fullest advantage of technological development in control means. This present equipment lends itself to sequential control by electronic means or by fluid means such as air or oil bearing fluid. These means have not been illustrated as they are all well known and are widely available on the market. In the exemplary showings herein, fluid cylinders have been used largely as the power activating means and this system lends itself very well to the electronic control of the fluid valves so that sequential operations can be achieved with substantially no dead time between operations.

Figures 1, 2:
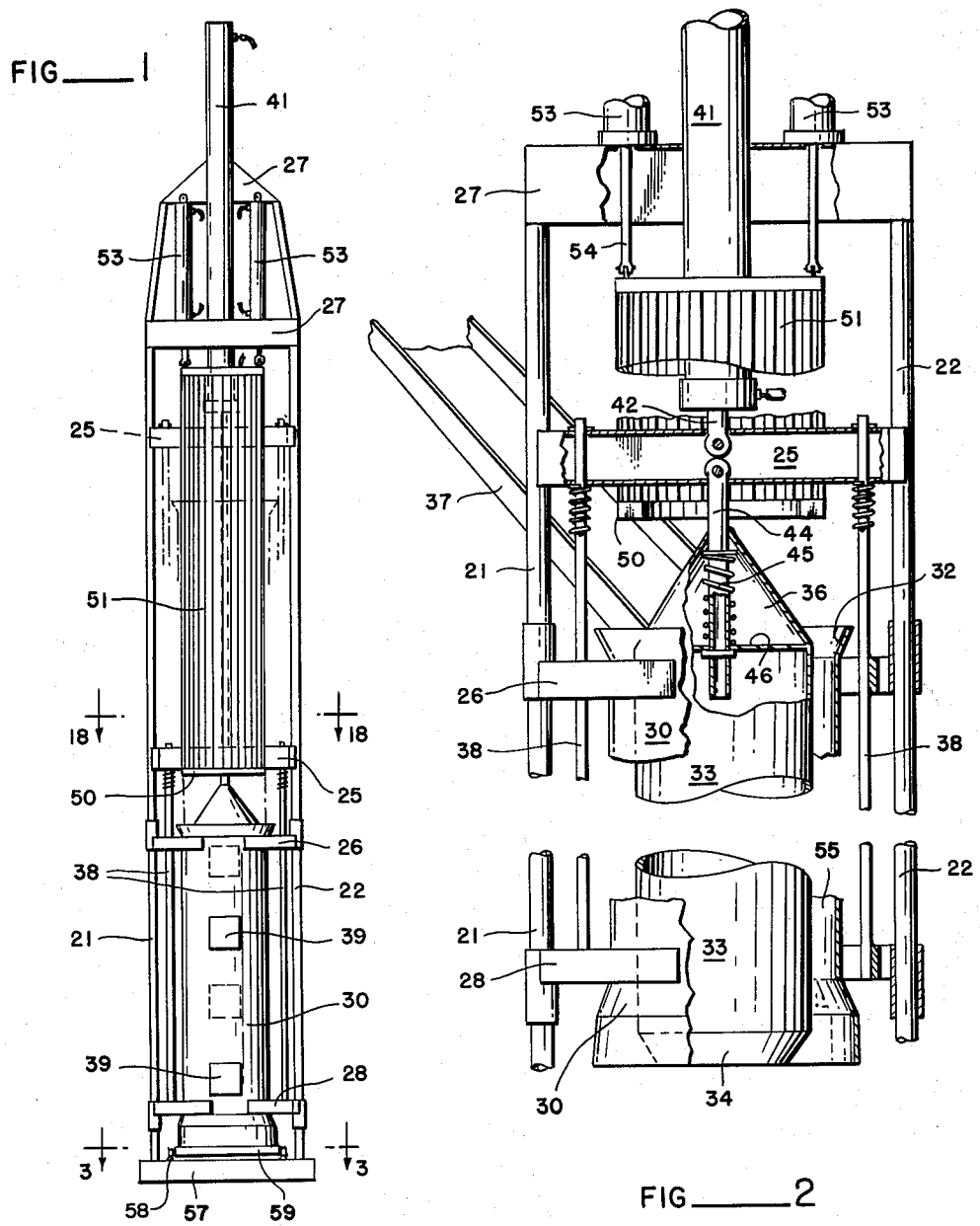
FIGURE 1 is a side elevation of one of my concrete pipe making machines as employed in making medium sized pipe.
FIGURE 2 is an elevation, on an increased scale, partly in section, and with parts broken away to more fully illustrate certain parts of the equipment and their functioning which cannot be disclosed in the small scale drawings.

In the drawings of FIGURES 1 and 2 particularly, a single relatively large pipe is under construction and this represents in the finished pipe substantially the maximum weight that this line of equipment, as used in this present example, is intended to serve. Considering the showing in FIGURES 8 and 9, two of the medium sized pipes are shown. These are both handled as a single operation; consequently the machine time is approximately the same as is required in making one large pipe. It therefore follows that if desirable, three or four smaller pipes might be made and the timing sequence of the machine would still remain constant and the plurality of small pipe would make up at least to a degree the weight of a single large pipe and thus provide an economical operation.

Referring to FIGURE 1 and the other figures of the drawings, the same reference characters will be used to indicate similar parts throughout. The parts may vary somewhat in size and exact structure but they are representative of the grouping of parts for the making of various size pipe with a single basic machine.

In FIGURES 1 and 8, base 20 is provided. This is normally made of cementitious material because of the ease with which structural steel members can be incorporated and held accurately in position. Fixedly secured in base 20 are vertical members 21 and 22. These are preferably of round shafting so that they can be used as accurate guides for moving parts of the equipment vertically and can also be tied together by a common header as 27 so that in turn header 27 may support certain functional parts of the machine. Disposed for reciprocation along guides 21 and 22 are a plurality of cross head members as 24 and 25 and guide members 26 and 28. Members 26 and 28 are detachably secured to the outer mold casing 30 which forms the outer wall of the form in which the pipe is cast. This may be a single casing 30, or a plurality of the same as indicated in FIGURE 8. The upper margin of casing 30 is preferably provided with a flared or funnel shaped portion 32. This may be, in the case of a single large casing, secured fixedly to the casing or it may be a separate member which may be ported so as to slip over a plurality of smaller casings for pipe of smaller diameter.

Disposed coaxially with casing 30 and having a smaller diameter is the core mold member 33. It will be believed apparent that the space 55 between the core 33 and the outer casing 30 is filled with concrete aggregates and determines the wall thickness of the pipe being made. The lower end of core 33 is in the form of a truncated cone 34 and the upper end 36 is conical. This conical upper end and the flared portion 32 of casing 30 assist in guiding concrete aggregates as they come down the filling spout 37 so that they will be reasonably distributed around the core. This distribution further is facilitated by fluid or electric vibrators as 39. These vibrators are spaced about the casing in keeping with the size thereof so as to first distribute the loose aggregate and then to cause a settling and compacting of the aggregate so that a dense walled pipe will result.

Reference is now made to FIGURES 2 and 9 where it will be noted that the movable crosshead members 25, 26 and 28 have a portion which encircles the case or casings 30 and accurately positions them. Due to the guiding effect of guides 21 and 22, this positioning is maintained even when the casing is raised as in stripping from the green pipe. Similarly to action of the crossheads, guide members 28 position the lower end of casings 30 and the upper guide member 26 positions the upper end of casings 30, the engagement should be free enough to permit the slight movement referred to in casing 30 when under vibration.

Referring to FIGURES 1 and 8 it will be noted that lifting rods 38 and 40 are secured in lifting relationship in crosshead 25. They are also secured to the secondary crossheads or guide members as 26 and 28 so that as crosshead 25 is raised the outer casing of the form 30 is raised. Raising of crosshead 25 is provided by the piston rod 42 which in the illustration is shown as secured to an adequate fluid cylinder 41, this cylinder being in turn secured to the upper fixed header or frame member 27.

The inner core member 33 is normally centered by the socket in contour former 70 as in FIGURE 12. The upper end of the core member 33 is actuately positioned by its lifting rod 44. This rod is pivotably secured to crosshead 25 and of course is raised by it. It has been found desirable to provide cushioning means and in the larger sizes the cushioning is so arranged by means of spring 45 and coacting with a bulkhead 46, made as part of the core 33, that, even though there be some slight stoppage at the bottom of the core there will be no bending or dislodgment of the core or its operating rod 44 which might throw it off its axial position. When a plurality of smaller sizes are being employed it is quite often desirable to provide a lifting spring below crosshead 46 in the form of a compression spring 47 so that the outer casing 30 may be started upwardly by crosshead 25 before the springs 47 are compressed. The cores 33 and outer casing 30 are then withdrawn substantially together from the green pipe.

Coaxially disposed with casing 30 and core 33 is a holddown ring 50. These rings 50 are of a size to fit in the molding space 55 between core 33 and the outer casing of the mold 30. The fit is normally quite close so that when appreciable pressure is applied to these rings in the compacting of the aggregates there will be no tendency for small bits of aggregate to pass by the ring and thus score the molds. Rings 50 are connected to the upper crosshead 24 by a column 51. In certain arrangements, particularly when one of the larger sizes is set up to make only one pipe at a time, it is desirable to split ring 50 and column 51 so they may pass over crosshead 25 as shown in FIGURE 2. This column may be made of spaced apart rods or tubes 52 as shown in FIGURES 15, 16 and 17, or they may be made of sharply corrugated steel plate, after the showing of FIGURE 18 at 52. Upper end of 52 is connected to crosshead 24, as noted in FIGURE 9. Movable crosshead 24 has no operational connection to cylinder 43 other than acting as a guide for it, but it does have operationally secured to it, preferably two, spaced fluid cylinders 53 which are fixedly secured to the upper header of frame member 27 and piston rods 54 are of a length so that ring 50 can be forced well down inside casing 30 if the nature of the aggregate should require pressure as well as vibration for its suitable compacting at all levels. Experience has shown that by having a column of adequate diameter sufficient stiffness against bending is obtained so that heavy pressure can be applied to the aggregates during the molding operation. In this connection, when suitable materials are used, many times the entire column will be adequately compacted without pressure except at the upper end where there is a tendency for the vibration to bounce the material and in effect prevent its settling. There is also another consideration, the difficulty of exactly measuring the amount of aggregate, and by applying adequate pressure at the upper end of the molding chamber 55 by means of ring 50, additional compacting that will insure a uniform finished length for the pipe can be achieved.

In the molding of belled end pipe it has been found that the actual formation of the bell and the handling of the pipe after it is molded is the most frequent cause of breakage or flaws. In this present machine, which is primarily for the production of belled pipe, special means have been developed, first to insure the complete filling of the lower or female end portion of the mold and its proper compacting and second, to insure an adequate support for the belled portion during the production and, in the larger sizes, in the transportation of the still green pipe to the curing area.

Figure 3:
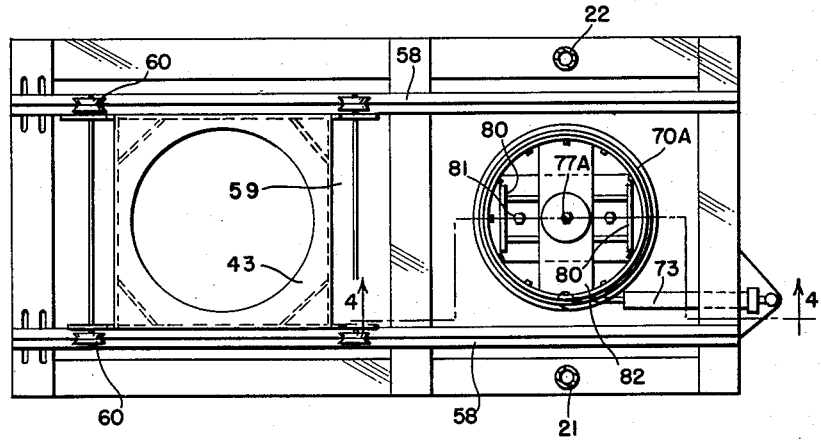
FIGURE 3 is a top plan view taken substantially along the line 3—3 of FIGURE 1 and illustrating additional parts not shown in FIGURE 1. This view generally shows the pipe and pipe supporting parts and the means forming the contour of the inside of bell and for the inside of the pipe bell after it is formed and wheeled carriage 59 ready to be moved into molding stage.

Reference is now made to FIGURES 3 and 5 which illustrate the movable carriage 59 and the bell supporting and the contour troweling means 70A and 76 used for larger pipe which may weigh as much as five tons. This structure is shown in greater detail in FIGURES 6 and 7. Disposed on base 20 are a plurality of transverse structural I beams 57 for certain installation the beams themselves may constitute a satisfactory base for the machine. Supported on these transverse beams 57 are longitudinal track members 58. Supported on tracks 58 are horizontal interchangeable slidable frames 59. In FIGURE 3 these frames in the larger machines, shown in FIGURES 3, 5, 6, 7 and 22, are provided with a plurality of wheels 60 adapted to engage tracks 58. In handling the smaller sizes of pipes where the weight is less it is sometimes possible to avoid the use of the wheels and thus simplify the structure. This is indicated in FIGURE 10 as the slidable frame or carriage 62.

The handling of the smaller plates is indicated in FIGURES 10, 11 and 14 in which the platen plates 43 are stored for use in the hopper 64; these are stripped out from the bottom as needed by the reciprocating plate 65, having two extended arms 65A with raised cam portions 66. Platen plate 43 may be designed with one or more openings shown in FIGURE 3 and FIGURE 10. The purpose of the extended arms 65A and cam portion 66 and associated parts including cylinder 67 is to provide an off bearer means whose purpose is to convey or push platen plate 43 with complete pipe out onto a further conveying means at the same time plate 65 is moving another plate 43 from hopper 64 into position over bell formers 70. Plate 65 is part of the reciprocating carriage controlled by the piston rod 66 which is in turn operated by the fluid cylinder 67. A shear pin is provided in this mechanism at 68 so that in case of a serious stoppage the pin will be sheared and no more serious damage will result.

Referring to FIGURE 12, it will be noted that the platen plate 43 is in place forming the bottom of the molding space 55, the balance of the mold being provided by the outer casing 30, the core 33 and the bell troweling and contour former 70. Mold element 70 is removably secured to the oscillating mechanism 71 by means of a nut and washer arrangement shown in 72. In the simpler form under discussion, where a plurality of pipe are being made at each cycle of the machine, when the molding space 50 is entirely filled, compacted and substantially ready for the removal of the mold, troweling member 70 is caused to oscillate approximately 20 to 30 degrees by means of the mechanism illustrated in FIGURE 13 which is controlled by a piston rod 73A of a double acting piston and fluid cylinder arrangement indicated at 73. In the simple form when the inside bell facing is troweled to a smooth surface, which takes only a few oscillations of member 70, member 70 is retracted to the dotted line position indicated at 74, by means of cylinder 77 and rod 77A, to permit the moving of the green pipe after the casing 30 and core 33 have been removed. In this instance there is no interior support for the bell as the pipe is being moved except that it rests and is moved on the platen plate 43 which is annular in form and gives a firm bearing for the bottom of the green pipe.

Referring now more particularly to FIGURES 3, 4, 5, 6 and 7 in which larger pipe is being molded, a platen plate 43 is placed upon the wheeled car 59 and is held accurately in place by the vertically extending lugs 75. This platen plate 43, as before, has an annular surface sufficient to fully engage the lower surface of the bell of the pipe being cast. Referring now to the lower dot and dash position of the bell troweling and mold member 70A, a pipe support plate 76 is employed and engaged interiorly of troweling member 70A and the whole unit then raised by the fluid cylinder 77. This support member has an interior bore into which the conical portion of the core 33 is naturally guided and the exterior form casing 30 is then put in place, with the various parts in the position shown in FIGURE 5. When the aggregate is in place and properly compacted the next operation is to cause troweling member 70A to oscillate after the same style as shown in FIGURE 13 and using the same cylinder 73 after which member 70A is retracted downwardly by means of cylinder 77 to the solid line position of the same. This troweling member 70A is an expensive unit and must be accurately made; consequently it is re-used with each pipe but member 76 is left in the bell to give support to the green pipe and special protection to the lower end thereof by carrying the weight of the pipe column. The downwardly extending walls 76A are initially supported by the straight walls 80 of member 81; this member is guided on piston rod 77A of cylinder 77, which also supports channel 82. Channel 82 descends until contact is made with member 81 which is raised or lowered as the cycle of operation requires. Eccentric means are provided for the two rods 84 so that when handles 85 are turned to the dotted line positions at 86, as shown in FIGURE 6, the eccentric lugs 87 engage walls 76A in four positions, two for each of the two rods 84. These rods are inserted into cutout spaces and pass on either side of support 80. Carriage 59 thus provides means for the transfer of the weight of the green pipe P, in the larger sizes, from member 80 to the wheeled carriage 59 when support members 80 and 81 are lowered. The pipe remains on wheeled carriage 59 until it has passed through the curing room into storage area where the pipe is removed and carriage 59 and platen 43 are returned to molding stage.

Figure 4:
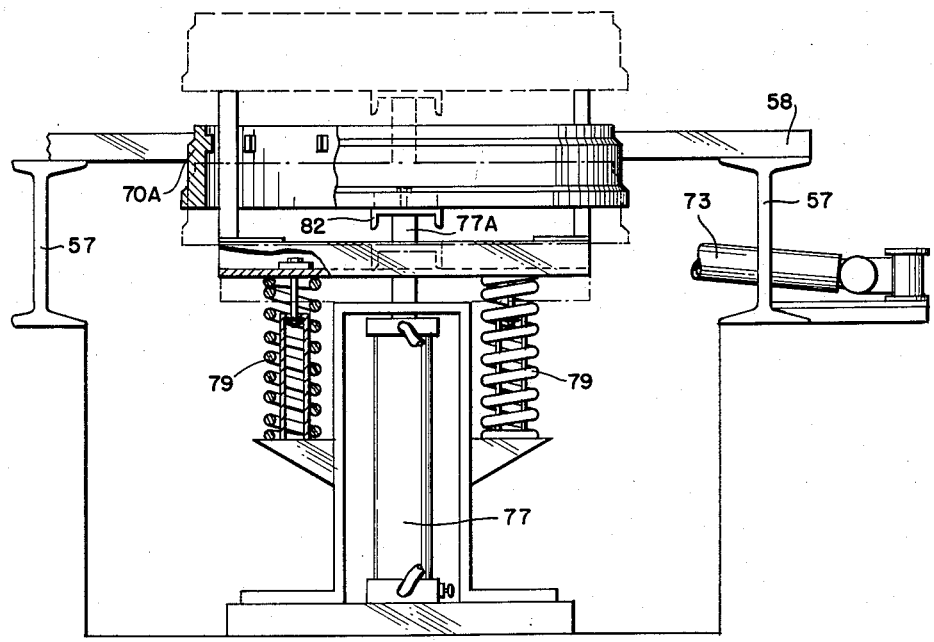
FIGURE 4 is a vertical sectional view on an increased scale taken along the line 4—4 of FIGURE 3.

When cylinder 77, shown in FIGURE 4, is energized member 82 controlled by rod 77A makes contact with 81 which, in turn, is supported by springs 79. Member 82 carries 81 downward with it, compressing springs 79. When appropriate movement is employed members 82 and 70A rise to operating position allowing members 81 and 80 to rise to a predetermined height limited by adjustment bolts 79A.

Referring to FIGURE 4 it will be noted that the piston rod 77A of cylinder 77 has secured to it the structural channel member 82 upon which is the bell supporting and troweling member 70A. A second structural member, channel 81, is supported by the duplex springs shown generally at 79 and is centered and positioned by a bearing 81A which slides on cylinder rod 77A. To provide clearance so the green pipe and its supporting plate can pass over the equipment centered around cylinder 77, channel 82 is moved to its lowered position by cylinder 77, as in FIGURE 4. When load transfer arms 84 are in position then 82 is lowered to the dotted position and the normal support of 80 and 81, which are carried downward against the biasing of spring 79 which is compressed by channel 81.

In any arrangement such as this where the prime purpose is to substitute mechanical means for manual labor it is necessary to have an orderly arrangement so that raw materials can be conveniently fed to the mixer and from the mixer to the molding machine and after the molding has been completed the green pipe must be transported to the curing room with minimum damage. Such an arrangement is shown in FIGURE 19, in which it will be noted that bins for sand and gravel have been provided. These material supply bins are normally elevated so that a gravity flow from the sand storage 90, gravel storage 91, and cement storage 92 will cause these materials to flow by gravity to the concrete mixer 93. Here, if need be, the materials can be raised by skip hoist 94 or this may be dispensed with if it is possible to have the storage bins and mixer 93 at sufficient elevation. The mix aggregate is supplied to the molding machine indicated at 95. When the molding is completed, as previously explained, the green pipe is moved by suitable conveying means 96 into the curing room 97 after which the cured or finished pipe is stacked or delivered for use and the various other essential operations are performed such as removal and conditioning of the pallets by cleaning and lubricating and conveying them to a point as to hopper 64, just ahead of the molding element 95 where they will be readily available for re-use.

Referring to FIGURES 20 and 21, a number of hydraulic and electrical units are noted. These are not illustrated in detail as many different units made by various manufacturers will serve equally well. Numeral 100 designates a four way solenoid valve and one such is used to remotely control each of the fluid cylinder and piston servo units as 41, 67, 77, 73, 53.

Numeral 101 refers to a standard type of hydraulic motor used to control the flow of aggregates down spout 37. Numeral 102 designates a common type of fluid pump used to draw fluid from tank 103 and supply the fluid, under pressure, to the plurality of solenoid valves 100. Numeral 104 is an electric motor used to drive pump 102. 105 designates the control panel which makes it possible to manually control the functioning parts and is especially useful in making adjustments, determining a suitable time cycle for new conditions, making repairs and the like. 106 designates limit switches which are used to control the various electric currents and insure sequential operation. The switches are actuated by various moving parts and it is believed such operation is generally well understood. On and off push button switches 107 are all subject to general control by the master switch 108 and are also actuated by the limit switches 106. By these means the cycle of operation as shown in FIGURE 20 can be achieved automatically. When it is desirable to operate any or all the steps in the cycle manually the central button 108 is rotated a partial turn to the manual position after which each actuator can be controlled by an individual button 110 as desired. 109 indicates a source of electric power.

In FIGURE 20 is shown the cycle of a typical operation during a time interval of one minute. Each function is shown on a time basis during the cycle. Reference is given to the numerous activator members or means, by their reference numeral used in the drawings, and their period of action within the time cycle.

Experience has shown that concrete pipe made with equipment as described in this present specification and as shown in the accompanying drawings, following the method outlined, will produce a high quality pipe which may have any acceptable end engagement means and which may also have any suitable metal reinforcement, with the minimum of labor so that it can be truly competitive with pipe made with other materials and thus again restore the concrete pipe to a place of more general application. The description and disclosure in the drawings are therefore believed to comprehend a novel construction of automatic concrete pipe molding machine for belled pipe as well as other shapes or ends.

Having thus disclosed the invention, I claim:

1. An apparatus for forming belled concrete pipe comprising a mold assembly comprising an outer mold casing, an inner mold core and a bell contour molding core detachably mounted at the lower end of said inner mold core; a concrete aggregate supplying means so positioned to enable delivery of said aggregate to the interstice between said outer mold casing and said inner mold core; vibratory means attached to said mold assembly facilitating tamping and settling of said aggregate; a hollow cylindrical tube of a diameter larger than said inner core yet smaller in diameter than said outer casing, said tube being connected to a pressure applying means enabling pressure to be applied in a downward direction to said aggregate in said mold; rotary means connected to said bell contour molding core to rotate the same and thereby provide a troweling effect; mold lift and removal means operatively connected to said inner mold core and said outer mold casing enabling joint upward removal of said mold core and mold casing while the molded pipe is held in place by said cylindrical tube; lowering means attached to said bell contour molding core enabling downward removal of said core upon completion of the molding operation; and table means underlying said mold casing and mold core, said table means being formed with an aperture for movement of said bell contour molding core.

2. Apparatus as recited in claim 1 in which said table includes movable support rods effective upon movement thereof to partially close said aperture to permit the interior bell contoured end of the pipe which is formed to be temporarily supported while said pipe is cured.

3. Apparatus as recited in claim 1 in which said mold lift and removal means includes a cross head connected to (1) the upper end of said inner mold core and (2) rod members extending below said cross head, said rod members having attached thereto means for lifting said outer mold casing.

4. Apparatus as recited in claim 1 in which said mold lift and removal means are directly connected to both of said inner mold core and said outer mold casing to effect simultaneous upward movement thereof.

References Cited in the file of this patent

UNITED STATES PATENTS

| | | |
|---|---|---|
| 729,431 | Sherry | May 26, 1903 |
| 1,029,560 | Pauly | June 11, 1912 |
| 1,137,680 | Tunison | Apr. 27, 1915 |
| 1,166,562 | Tunison | Jan. 4, 1916 |
| 1,977,257 | Williams | Oct. 16, 1934 |
| 2,178,015 | Brunetti | Oct. 31, 1939 |
| 2,496,016 | Nelson | Jan. 31, 1950 |
| 2,640,579 | Schutt | June 2, 1953 |
| 2,032,523 | Black | Mar. 3, 1956 |

FOREIGN PATENTS

| | | |
|---|---|---|
| 340,486 | Great Britain | Dec. 23, 1930 |
| 1,116,341 | France | Jan. 30, 1956 |
| 83,975 | Netherlands | Jan. 15, 1957 |